United States Patent [19]
Dueringer

[11] 3,784,109
[45] Jan. 8, 1974

[54] DEPLOYABLE NOZZLE EXTENSION FOR ROCKET ENGINES

[75] Inventor: John Wilbur Dueringer, Kenmore, N.Y.

[73] Assignee: Textron, Inc., Providence, R.I.

[22] Filed: May 22, 1972

[21] Appl. No.: 255,394

[52] U.S. Cl................... 239/265.19, 239/265.43
[51] Int. Cl............................................. B63h 11/10
[58] Field of Search.............. 239/265.11, 265.19, 239/265.33, 265.43

[56] References Cited
UNITED STATES PATENTS

| | | | |
|---|---|---|---|
| 3,270,504 | 9/1966 | Ward | 239/265.33 |
| 3,346,186 | 10/1967 | Fulton et al. | 239/265.43 X |
| 3,526,365 | 9/1970 | Paine | 239/265.43 |
| 3,561,679 | 2/1971 | Lager | 239/265.11 |
| 3,596,465 | 8/1971 | Paine | 239/265.43 X |

Primary Examiner—M. Henson Wood, Jr.
Assistant Examiner—John J. Love
Attorney—Bean & Bean

[57] ABSTRACT

A deployable nozzle for rocket engines and method of making same is disclosed in which the extension initially is in collapsed state and is provided with a detachable cover so that internal pressure may be utilized to extend and deploy the extension. The extension includes an outer convolution of annular divergent frusto-conical form joined along a fold line to an intermediate convolution also of frusto-conical form but directed oppositely from the outer convolution and the intermediate convolution is joined at its small end to a divergent frusto-conical rocket nozzle portion through a relatively narrow cylindrical band which surrounds the divergent nozzle portion and is joined to it at a point spaced from the end of such nozzle portion. The length of this band is of predetermined relation with respect to the length of the free end portion of the nozzle extension such that when the nozzle extension is deployed, it will unroll over the edge of the free end of the nozzle extension to embrace it and form a non-offset and coplanar extension of the inner surface of the rocket nozzle portion.

14 Claims, 9 Drawing Figures

PATENTED JAN 8 1974 3,784,109

3,784,109

DEPLOYABLE NOZZLE EXTENSION FOR ROCKET ENGINES

CROSS REFERENCE TO RELATED APPLICATION

This application discloses subject matter related to that described in copending application, Ser. No. 125,087, filed Mar. 17, 1971, now U.S. Pat. No. 3,711,027 dated Jan. 16, 1973 and assigned in common herewith.

BACKGROUND OF THE INVENTION

As is well known, the expansion ratio of a rocket engine required for maximum thrust efficiency varies with the absolute ambient pressure. In multi-stage rocket engines where a later stage is to be fired in space or at high altitudes, the expansion ratio is relatively great and would require a divergent exit nozzle portion of the rocket engine which is of substantial length. However, to make a second or later engine stage of such overall length as would be required to produce a reguisite expansion ratio would be extremely cumbersome and wasteful of otherwise usable space in the rocket assembly. Thus, it is desirable to provide means associated with a rocket engine so that a divergent nozzle of a length suitable for maximum thrust at low ambient pressure may be obtained by deploying such means. In this way, the rocket engine may be very compact so the entire assembly when stored does not add appreciably to the length of the normal combustion chamber and divergent nozzle portions of the rocket engine. The expansion ratio of such compact assembly may be increased to that greater value will render the thrust efficient with zero or substantially zero ambient pressure simply by deploying the extension means. Numerous attempts have been made to provide such extensions and they may be broadly categorized in either one or two classes. In the first class, the extension is made of some flexible and essentially nonresilient material such as is disclosed for example in U.S. pat. No. 3,596,465. The other class of prior art extensions employs a series of frusto-conical sections which are not joined but which are movable from a collapsed state to an extended state. This latter type employs metallic sections and is exemplified by U.S. Pat. No. 3,183,664.

Due to the materials used in the first mentioned class of nozzle extensions, it is extremely difficult to obtain sufficient cooling to prevent the extension when deployed from burning out. In the second class of extensions, it is extremely difficult to effect a good seal between the several frusto-conical sections and the means for deploying them properly is inherently complex, cumbersome and heavy.

Unfortunately, the inherent problems of both of these classes of nozzle extensions are considerably magnified were they to be used with the more powerful rocket engines currently being developed. The reason for this is that more powerful engines employ substantially greater chamber pressure and temperature than previous rocket engines and this only magnifies the problems as discussed above.

To avoid the problems of the prior art, and to provide a deployable rocket nozzle extension which is of essentially uniform and uninterrupted construction when deployed and which provides a smooth interior which is essentially a continuation of the rocket nozzle portion to which it is attached, the deployable nozzle extension of the aforesaid commonly assigned U.S. Pat. No. 3,711,027 was developed. The required frusto-conical extension configuration producing the requisite half angle of the nozzle exit cone of this nozzle extension may be constructed by shear spinning it from a suitable circular blank of sheet metal. The extension may then be telescopically rolled back upon itself to provide an inner convolution surrounded by an outwardly spaced but parallel outer convolution joined by a reverse-directed intermediate convolution.

Alternatively, the three convolutions may be formed separately and joined together as a unitary whole in the collapsed condition by means of welding. In any event, the three sections are joined together so that at least the outer and intermediate sections merge along a peripheral or annular fold and outer convolution may be closed by a cover. By internally pressurizing the rocket chamber, as by slow-starting it, the pressure reacting against the cover will cause the fold joining the outer convolution to the intermediate convolution preferentially to unroll until it reaches the juncture or the fold between the intermediate convolution and the inner convolution. Mechanical means may also be used for this purpose such as is shown for example in U.S. Pat. No. 3,346,186. Due to the fact that the unrolling action produces a certain amount of radial stretching of the metal, a certain amount of radial "offset" will be produced between the inner convolution and the intermediate convolution at the point at which the two are joined. Although it is possible to exert sufficient force against the cover to straighten out and stretch the material in this area so that a substantially smooth and uninterrupted extension of the inner surface of the divergent end of the rocket engine is achieved, a certain amount of radial offset will be produced in any case. Moreover, it is in general undesirable to carry the force-exerting pressure to such an extreme. This is particularly true where the deploying force is produced by mechanical means such as piston-cylinder arrangements inasmuch as the mechanical means must be designed to exert the requisite greater terminal straightening force and thus must be more robust and heavier than is required merely for deployment up to the terminal point. Although the unrolling force can be reduced and the terminal straightening effect thereby rendered easier by reducing the thickness of the metal forming the deployable nozzle, there is a definite limit with respect to this thickness wherein buckling of the intermediate convolution will occur. Although it is possible to approach the problem in this manner and utilize such thin material, it will be necessary to provide reinforcement for the intermediate convolution to prevent its buckling during deployment and thus the weight saving achieved by the thin extension metal is largely offset or may be exceeded by the weight of the anti-buckling means. Accordingly, it is generally more desirable to avoid the necessity for any anti-buckling means and instead to make the wall thickness of the nozzle extension sufficiently large as to prevent buckling in the first place. In any case, the problem of radial offset of the inner fold remains and it would be desirable to remove this problem in many cases.

BRIEF DESCRIPTION OF THE INVENTION

The present invention is directed to a deployable nozzle in which the above problems are overcome. This is accomplished by providing an end portion on the inner divergent section which extends beyond the juncture or attachment between the intermediate convolution and such inner divergent section and by providing a cylindrical band section of the intermediate convolution where it joins the inner section. With such an arrangement, it is possible to avoid the radial offset problem and thereby to achieve an extremely smooth joint at the free edge of the inner when the when extension is deployed.

DETAILED DESCRIPTION OF THE DRAWINGS

DETAILED DESCRIPTION OF THE INVENTION

Figure 1:
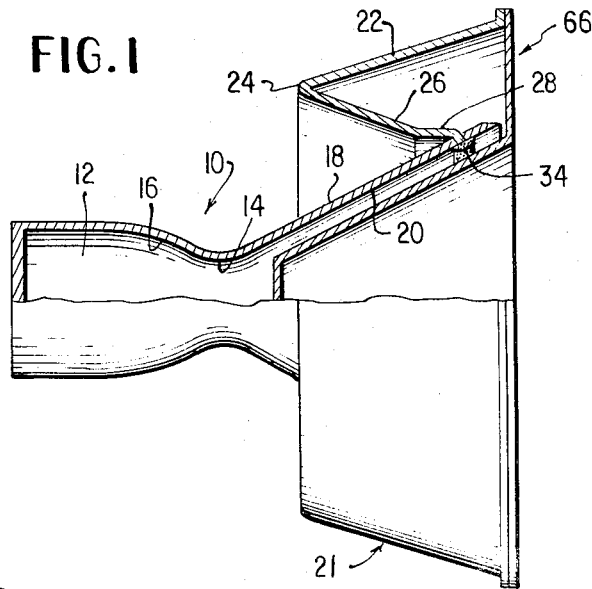
FIG. 1 is a side elevational view partly in section illustrating one embodiment of the present invention.

With reference to the embodiment of the invention as is shown in FIG. 1, reference character 10 indicates generally a rocket engine which includes a chamber 12 wherein controlled combustion takes place for the generation of high mass rate flow combustion gases, as is well known. As is also conventional, the chamber 12 opens onto a restricted throat portion 14 through a convergent section 16 and there is provided a nozzle portion 18 having a divergent inner surface 20 merging smoothly with the throat 14 as shown.

The deployable portion of the rocket nozzle extension is indicated generally by the reference character 21 and will be seen to consist of an outer frusto-conical convolution or section 22 having its smaller diameter end joined along a line of fold 24 to an intermediate, frusto-conical convolution or section 26 which terminates at its smaller diameter end in a short cylindrical portion 28 having an inturned end portion 30 (see particularly FIG. 2) sandwiched between the end edge of the inner section 18 and the inner edge of a free end portion 32 which effects a short continuation of the inner divergent section 18. These parts are joined together along a line of weld 34 in the manner shown.

Figure 2:
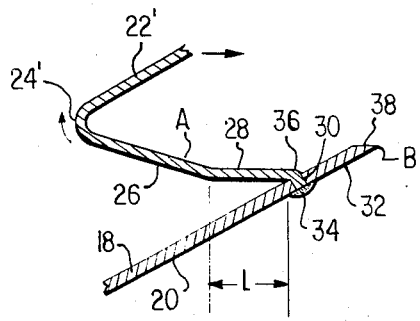
FIG. 2 is an enlarged sectional view illustrating certain details of the invention during deployment.
Figure 3:
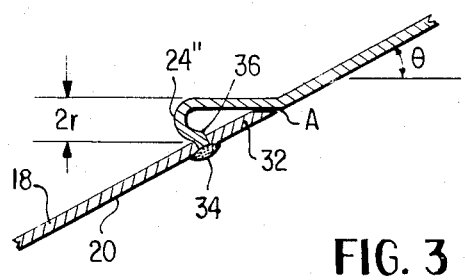
FIG. 3 is a view similar to FIG. 2 but illustrating the fully deployed position.

The geometry of the device which is such as to achieve the very smooth inner surface for the nozzle and its extension when deployed is indicated in FIGS. 2 and 3. In FIG. 2, it will be seen that the length L of the cylindrical band portion 28 is such as permits the point A to reach the position shown in FIG. 3 when the device is deployed so that such point A lies substantially at and in close relation to the bevelled edge B of the continuation portion 32 so that no gap and a smooth continuation of the inner surface 20 is effected without requiring either the line of fold at 36 defined between the inner divergent section 18 and the portion 28 or the traveling line of fold 24'' which is formed by rolling of the fold line 24 to be straightened excessively. In FIG. 2, the unrolling action causes the fold 24' of FIG. 1 to travel as is shown at the fold 24' in FIG. 2 as it is approaching the band 28, it being appreciated that the rolling will commence preferentially at the fold 24 and not at 36 because less energy is required to roll the larger circular fold 24 than is required to roll the smaller circular fold 36. The force required to cause rolling at an annular fold is a function of the angle through which the fold must be rolled, the diameter of the circular fold line and of the thickness of the material involved and these factors also determine the radius of the fold produced as it travels. If the force is obtained by internal pressure, then the magnitude of the available force is a function of the diameter of the circular fold line squared. Generally speaking, for the same thickness of material throughout, the larger the diameter of the annular fold line, the larger the roll radius and the easier it is to unroll it will internal pressure and this accounts for the preferential rolling as above. As the rolling progresses and the diameter of the circular fold decreases, the traveling fold radius decreases and can be predicted for any particular diameter of the annular fold line Thus, the radius of the fold 24'' in FIG. 3 can easily be predicted because the diameter of the circular fold is known.

From these considerations, it can be shown that the length L of the cylindrical band 28 of the undeployed extension as shown in FIGS. 1 and 2 should be equal $(2r/\text{Tan }\theta)+\pi r$ where $\theta$ is the one-half angle of the nozzle extension as shown in FIG. 3 and r is the radius of the fold at 24'' when deployment is completed as shown in FIG. 3. The axial extent of the continuation portion 32 to its tip edge B (see FIG. 2) is easily calculated for any given case and is, in any event, approximately equal to $2r/\text{Tan }\theta$, it being appreciated that the outer face 38 of the continuation portion 32 is bevelled so as to lie parallel to the axis of the nozzle extension.

Figure 4:
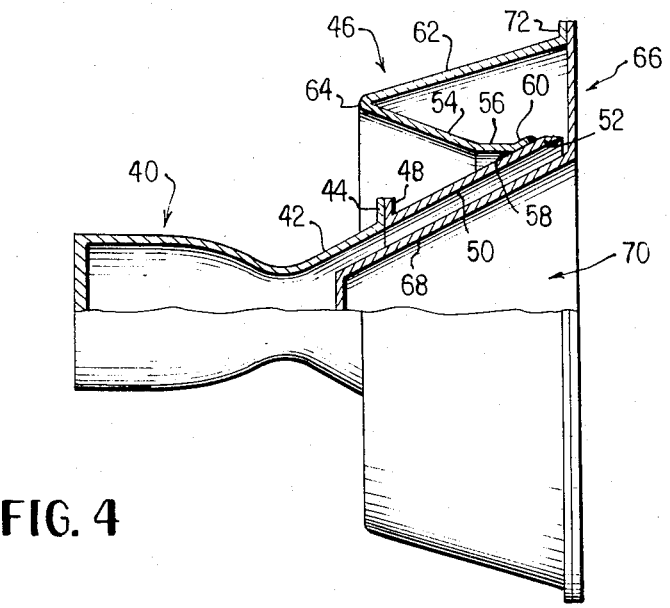
FIG. 4 is a view similar to FIG. 1 but presenting a further modified form of the invention.

An alternative form of construction is shown in FIG. 4. In this Figure, a rocket engine is indicated by the reference character 40 and will be seen to have a divergent section 42 provided with an attachment flange 44 by means of which the deployable nozzle extension assembly indicated generally by the reference character 46 is attachable thereto as by suitable fasteners, such extension being provided with an attachment flange 48 as shown. In this form of the invention, the inner convolution 50 is uninterrupted through its continuation portion 52 (corresponding to the portion 32 of FIGS. 1-3 and likewise presenting as shown in FIG. 4 a bevelled outer face as at 38 in FIG. 2) and the intermediate convolution 54 merges with the annular cylindrical band portion 56 to intersect the portion 50 and is welded thereat to such section 50 as indicated by the reference character 58. For good seating purposes, the band 56 is provided with an outwardly flared section 60 which surrounds and seats upon a corresponding outer surface portion of the inner convolution 50.

The outer convolution 62 is once again joined to the intermediate section 54 along the fold line 64 along which preferential rolling occurs when the deployment action takes place.

In the case both of the form shown in FIG. 1 and that of FIG. 4, a detachable cover assembly 66 may be employed, being identical in each case. As is shown for example in FIG. 4, the cover assembly includes a depressed central section or cup 68 defining a recess 70. This recess is provided for allowing a maximum saving in space inasmuch as a preceding stage may be nested partially into this recess 70 further to effect a compact system. The cover assembly 66 is peripherally secured to a flange portion 62 and means such as is disclosed in the aforesaid application U.S. Pat. No. 3,711,027 assigned in common herewith is employed to effect detachment of the cover assembly 66 at the requisite time when the extension assembly has been properly deployed to the position shown in FIG. 3.

Figure 5:
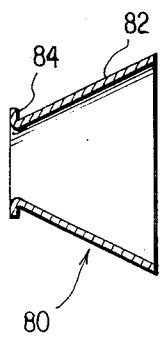
FIGS. 5 and 6 illustrate portions of the preferred embodiment of the invention.
Figure 6:
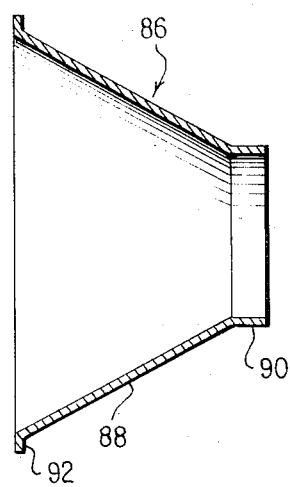

FIGS. 5–8 illustrate a preferred embodiment of the invention and the manner in which it is formed. In FIG. 5, the inner section is indicated by the reference character 80 and may be formed by shear spinning techniques from a suitable blank to include a belled or frusto-conical main body portion 82 having an annular attachment flange 84 at its smaller diameter end by means of which the device may be attached to the exit end of a rocket nozzle as in FIG. 4. The outer section 86 is indicated in FIG. 6 and it too preferably is formed by shear spinning techniques from a suitable blank to provide the belled or frusto-conical main body portion 88 having a cylindrical portion 90 at its smaller diameter end and an annular flange 92 at its larger diameter end. The flange is responsible for allowing the rolling to start properly, as will be explained presently.

Figure 7:
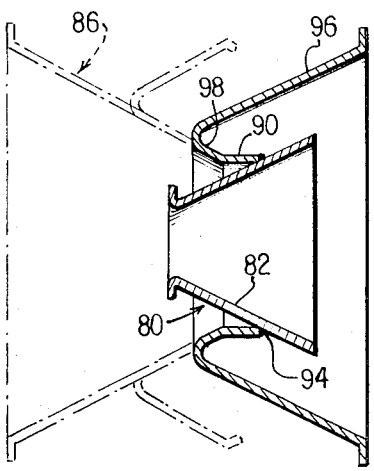
FIG. 7 is a sectional view illustrating certain features of the present invention.

These two portions of the assembly are joined together as by welding along the periphery at 94 as indicated in FIG. 7 with the outer section initially extending forward as indicated by the dash-dot lines, whereafter the outer section is rolled back over the inner section ultimately to be disposed with relation thereto in the fashion indicated by the dashed line showing to present the outer convolution 96 and the intermediate convolution comprised of the belled or frusto-conical section 98 which merges into the aforementioned cylindrical section 90 which is joined to the main body portion 82 of the inner convolution 80. The full line position is intended to show the assembly in partial deployment.

Figure 8:
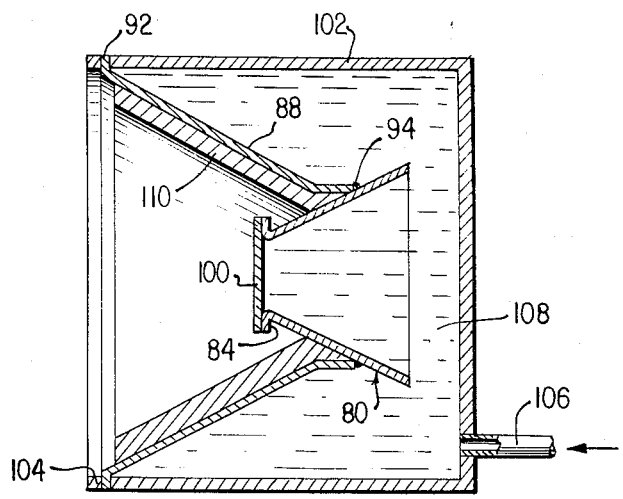
FIG. 8 is a sectional view illustrating apparatus for forming a nozzle extension.

FIG. 8 illustrates a preferred manner in which the rolling back of the assembly is achieved. As shown, the attachment flange 84 of the inner section 80 is utilized to mount a closure plate 100 whereas the flange 92 of the outer section is employed peripherally to secure the outer section to the open end of a chamber or housing member 102, a detachable mounting ring 104 being utilized for this purpose. With the parts thus assembled, the interior of the housing 102 is closed to define a pressure fluid chamber into which pressurized fluid such as water is introduced through the inlet 106 which, due to the pressure of the water 108 filling the chamber causes the rolling back as indicated in FIG. 7. A frusto-conical reinforcing member 110 may be employed to back up the main body 88 of the outer section 86 during this procedure in order to stabilize it and positively to prevent the possibility of buckling of the section 88 during the rolling back operation.

In devices of this nature, an important consideration is that the extension be self-aligning during the deployment operation and a configuration illustrated herein positively effects such self-alignment.

It can be shown that the force required to roll the material along an annular fold line is a function of the ratios $D/t$ and $r/t$ where D is the inside diameter of the annular fold line, $r$ is the inside roll radius around which the material bends and $t$ is the thickness of the material; and is also a function of the angle through which the bending occurs. Since the roll-through angle of the belled or frusto-conical section 88 is equal to 180° minus the included angle of the core, whereas the roll-through angle of the cylindrical section 90 is 180°, the largest rolling pressure requirements during deployment are at the terminal portion of deployment when the cylindrical section is being unrolled.

Figure 9:
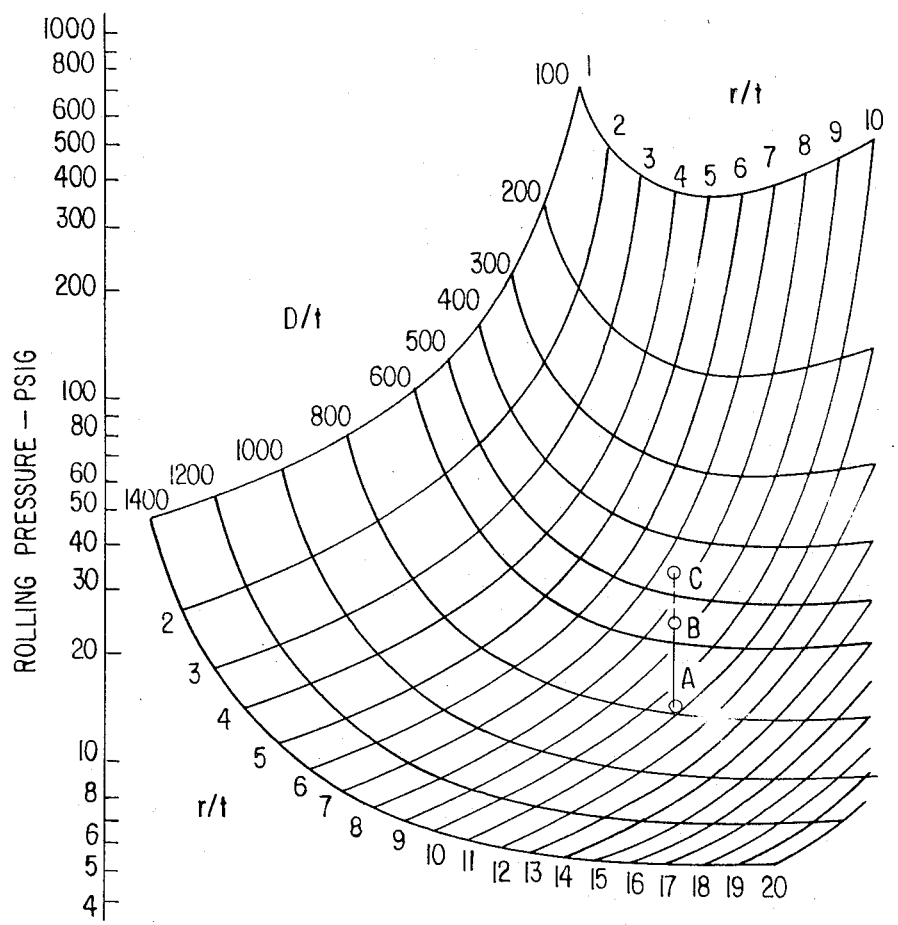
FIG. 9 is a graph illustrating certain relationships of the forming operation.

To illustrate the relations between these parameters with respect to the forming operation by the method shown in FIG. 8, reference is had to the graph of FIG. 9 which illustrates families of curves of rolling pressure (of the hydraulic medium 108) as a function of the dimensionless ratios $D/t$ and $r/t$.

The point A shows the pressure required at the commencement of rolling in the assembly of FIG. 8 and the point B shows the pressure required at the termination of the forming operation. The dashed line extending from point B to point C illustrates the further rolling along the conical section (that is until the cylindrical section is reached) which results during deployment.

It will be appreciated that the inside roll radius $r$ which results at that particular point at which the forming operation terminates will be some predictable value dependent upon the material used, its thickness, the roll-through angle, and the inside diameter of the annular fold. Indeed, the inside roll radius may be predicted for any point either on the conical section or on the cylindrical section so that, as described in conjunction with FIG. 3, the length of the extension 32 may be determined with accuracy.

It will further be appreciated that both during the forming operation and during subsequent deployment, the rolling will proceed under conditions of minimum energy expended by the means which effects the rolling. If this means is in the form of internal pressurizing means both for forming and later for deployment, it will be seen that the conditions of deployment may be calculated with precision. Thus, the system can be designed by very rapid deployment and this represents an important feature. As a matter of fact, nozzle extensions for full size engines are capable of deployment within time periods of but a fraction of a second. In this way, during stage separation, the next-stage engine can be readied for firing without loss of time.

The self-aligning feature, regardless of the method of deployment, results from the fact that if misalignment were to commence, the leading portion of the fold requires a greater roll-through angle than at the lagging portion thereby to increase the required rolling force. This is an inherent feature of rolling down (i.e., from the larger to the smaller end) the conical section which preferential rolling effect occurs naturally so long as means is not employed to prevent it. That is to say, as will be seen clearly from FIG. 9, rolling commences preferentially at the largest diameter D section because the least rolling pressure is required (i.e. rolling pressure decreases as $D/t$ increases). force.

With internal pressure as the deploying means, an additional self-aligning effect is obtained due to the fact that the rolling force is proportional to $D^2$ and the leading side will have a smaller effective diameter D which thereby reduces the available rolling fork $e$.

What is claimed is:

1. A rocket engine nozzle extension for use with a rocket engine having a combustion chamber discharging to a restricted throat followed by a divergent conical nozzle section terminating in a frusto-conical free end portion, said extension being deployable from an intially collapsed state to form an expansion ratioincreasing extension of said divergent conical section, said nozzle extension comprising:
  a cylindrical section secured exteriorally to said divergent conical section in coaxial surrounding relation thereto and extending forwardly therefrom toward said combustion chamber;
  a frusto-conical intermediate convolution extending divergently and forwardly from said cylindrical section; and
  a frusto-conical outer convolution extending divergently and rearwardly in surrounding relation to said intermediate convoltuion, said outer convolution being joined to said intermediate convolution along an annular fold;
  said cylindrical section being of a diameter sufficiently smaller than the diameter of the free end edge of said frusto-conical free end portion and of a length relative to the length of said frusto-conical free end portion as to permit said annular fold to roll through said intermediate convolution and said cylindrical section thereby lengthening said outer convolution and causing it to form a substantially smooth extension of said nozzle section at said free end edge of said frusto-conical free end portion.

2. A rocket nozzle extension as defined in claim 1 including means for causing said annular fold to roll through said intermediate convolution and said cylindrical section to deploy the extension.

3. A rocket nozzle extension as defined in claim 2 wherein said means comprises a cover detachably fixed to the open end of said outer convolution.

4. A deployable nozzle for rocket engines comprising, in combination:
  an inner section having a divergent inner surface of generally conical form;
  an intermediate convolution surrounding said inner section and having an outer surface diverging in the direction opposite to the divergence of said inner surface and adapted to be deployed into registry with said inner surface of the inner section with minimal radial offset with respect thereto;
  a cylindrical band joining the smaller end of said intermediate convolution to said inner section along a circumferential line located in spaced relation to the larger diameter free end edge of said inner section;
  an outer convolution surrounding said intermediate convolution and having a divergent inner surface facing the same direction as the inner surface of said inner section; and
  an annular fold section joining the larger diameter end of said intermediate convolution to the smaller diameter end of said outer convolution.

5. A deployable nozzle for rocket engines as defined in claim 4 wherein the free end of said inner section is bevelled to present an outer face substantially parallel to and concentric with the axis of said nozzle to intersect said inner surface of the inner section at said free end edge; and the diameter of said cylindrical band being sufficiently smaller than the diameter of said free end edge and of a length relative to the length of that portion of said inner section which is beyond said cylindrical band as to permit said annular fold section to roll through said intermediate convolution and said cylindrical band thereby lengthening said outer convolution and causing it to form an extension of said inner section beginning at said free end edge and with a rolled over portion of said cylindrical band overlying and in closely spaced relation to said outer face of the free end of said inner section.

6. A deployable nozzle for rocket engines as defined in claim 5 wherein said inner section comprises a first frusto-conical portion remote from said free end edge of the inner section and a second frusto-conical portion attached to and forming a continuation of said first portion.

7. A deployable nozzle for rocket engines as defined in claim 6 and in combination therewith:
  a rocket engine having a combination chamber and a restricted throat;
  said first frusto-conical portion being integrally joined to said rocket engine and presenting a divergent section from said restricted throat.

8. A deployable nozzle for rocket engines as defined in claim 5 and in combination therewith:
  a rocket engine having a combustion chamber and a restricted throat;
  said inner section being integrally joined to said rocket engine and presenting a divergent section from said restricted throat.

9. A deployable nozzle for rocket engines as defined in claim 4 and in combination therewith:
  a rocket engine having a combustion chamber and a restricted throat;
  said inner section being integrally joined to said rocket engine and presenting a divergent section from said restricted throat.

10. A deployable nozzle for rocket engines ad defined in claim 4 wherein said inner section comprises a first frusto-conical portion remote from said free end edge of the inner section and a second frusto-conical portion attached to and forming a continuation of said first portion.

11. A deployable nozzle for rocket engines as defined in claim 10 and in combination therewith:
  a rocket engine having a combustion chamber and a restricted throat;
  said frusto-conical portion being integrally joined to said rocket engine and presenting a divergent section from said restricted throat.

12. A rocket engine nozzle extension as defined in claim 1 wherein said frusto-conical free end portion terminates in a bevel presenting an outer face substantially parallel to and concentric with the longitudinal axis of the nozzle extension and which outer face intersects the inner surface of said free end portion to define said free end edge, a rolled over portion of said cylindrical section overlying said outer face in closely spaced relation thereto when the extension is deployed.

13. A rocket engine nozzle extension as defined in claim 12 wherein said divergent conical nozzle portion of the rocket engine comprises a first frusto-conical section extending from said restricted throat and a second frusto-conical section forming a continuation of and attached to said first frusto-conical section.

14. A rocket engine nozzle extension as defined in claim 1 wherein said divergent conical nozzle portion of the rocket engine comprises a first frusto-conical section extending from said restricted throat and a second frusto-conical section forming a continuation of and attached to said first frusto-conical section.

* * * * *

UNITED STATES PATENT OFFICE
CERTIFICATE OF CORRECTION

Patent No. 3,784,109         Dated January 8, 1974

Inventor(s)    John Wilbur Doeringer

It is certified that error appears in the above-identified patent and that said Letters Patent are hereby corrected as shown below:

Column 2, line 34, "offset" should read -- "offset" --. Column 3, line 7, after "inner" insert -- section --; same line 7, cancel "when", second occurrence; line 67, "24′" should read -- 24 --. Column 4, line 16, "will" should read -- with --; line 27, cancel the parentheses; line 26, after "be" insert -- chosen to --. Column 5, line 3, cancel "application". Column 6, line 1, "core" should read -- cone --; line 56, cancel "force"; line 61, "fork e" should read -- force --. Column 8, line 13, "combination" should read -- combustion --.

Signed and sealed this 24th day of September 1974.

(SEAL)
Attest:

McCOY M. GIBSON JR.
Attesting Officer

C. MARSHALL DANN
Commissioner of Patents